(12) United States Patent
Gruner et al.

(10) Patent No.: US 8,520,365 B2
(45) Date of Patent: Aug. 27, 2013

(54) CHARGE STORAGE DEVICE ARCHITECTURE FOR INCREASING ENERGY AND POWER DENSITY

(75) Inventors: George Gruner, Los Angeles, CA (US); Ian O'Connor, Santa Monica, CA (US)

(73) Assignee: Amperics Inc., Los Angeles, CA (US)

( * ) Notice: Subject to any disclaimer, the term of this patent is extended or adjusted under 35 U.S.C. 154(b) by 40 days.

(21) Appl. No.: 13/089,299

(22) Filed: Apr. 18, 2011

(65) Prior Publication Data

US 2011/0255214 A1    Oct. 20, 2011

Related U.S. Application Data

(60) Provisional application No. 61/325,326, filed on Apr. 18, 2010.

(51) Int. Cl.
*H01G 9/00* (2006.01)

(52) U.S. Cl.
USPC ........... 361/502; 361/503; 361/504; 361/512; 361/517; 361/519

(58) Field of Classification Search
USPC ......... 361/502, 503–504, 509, 512, 516–519, 361/525, 528–529
See application file for complete search history.

(56) References Cited

U.S. PATENT DOCUMENTS 8,277,691 B2 * 10/2012 Lu .................................. 252/511
2008/0251971 A1 * 10/2008 Kim et al. ..................... 264/465

* cited by examiner

*Primary Examiner* — Nguyen T Ha
(74) *Attorney, Agent, or Firm* — Jeffrey Jue; Catalyst IP Group

(57) ABSTRACT

The present invention relates generally to charge storage devices with at least one electrode having combined double layer supercapacitor, electrochemical supercapacitor and/or battery functionalities. In some embodiments, the electrode, may be composed of an ECS material, a highly-structured DLS material and a less-structured DLS material.

17 Claims, 16 Drawing Sheets

610
320
630
305

640
320
650
305

660
320
670
305

680
320
690
305

CHARGE STORAGE DEVICE ARCHITECTURE FOR INCREASING ENERGY AND POWER DENSITY

CROSS-REFERENCE TO RELATED APPLICATIONS

This application claims priority from U.S. provisional application No. 61/325,326, filed on Apr. 18, 2010, and incorporated herein by reference in its entirety.

FIELD OF THE INVENTION

The present invention relates generally to charge storage devices with at least one electrode having combined double layer supercapacitor, electrochemical supercapacitor and/or battery functionalities.

BACKGROUND OF THE INVENTION

Supercapacitors (also known as ultracapacitors) have been attracting numerous interests because they can instantaneously provide higher power density compared to batteries and higher energy density compared to the conventional dielectric capacitors. Such outstanding properties make them excellent candidates for applications in hybrid electric vehicles, computers, mobile electric devices and other technologies.

Generally, an electrochemical capacitor may be operated based on the electrochemical double-layer capacitance (EDLC) formed along an electrode/electrolyte interface, or a pseudocapacitance resulted from a fast reversible Faradaic process of material that undergoes Faradaic reactions (a "Faradaic material," e.g., redox-active materials such as metal oxides and conductive polymers). In the present application, an EDLC-based capacitor is referred to as a double layer supercapacitor (DLS) and an electrode material coated onto a current collector in a DLS is referred to as a DLS material; a pseudocapacitance-based capacitor and/or one based on ion insertion is referred to as an electrochemical supercapacitor (ECS) and an electrode material coated onto a current collector in an ECS is referred to as an ECS material; an electrode material coated onto a current collector in a battery (e.g., Galvanic cell) is referred to as a battery material; "electrolyte" refers to the material which provides the ionic conductivity between supercapacitor electrodes; and "charge collector" refers to an electrically conducting material that connects the supercapacitor to an electronic circuit or other device(s).

For a DLS, the rapid charge/discharge process provides the capacitor with a high power density, yet the energy density is limited by its effective double-layer area. To date, a large number of DLS materials (e.g., high-surface-area materials, such as activated carbon, templated carbon, and carbon nanotubes (CNTs)) have been extensively studied. Activated carbons, with surface areas from 1000-2500 $m^2/g$, are the most commonly used materials, which may provide a capacitance up to 320 F/g at low potential scanning rate. However, the capacitance may drop dramatically at high scanning rates because of their tortuous pore structure and high microporosity. The templated carbons, on the other hand, exhibit uniform pore geometry and larger pore size; however, they did not show any exciting improvement in either energy or power performance. For comparison, multi-walled CNTs show capacitances up to 135 F/g and single-wall CNTs show capacitances up to 180 F/g, which are still low for an actual device application.

Compared with the DLS materials, ECS materials (e.g., based on metal oxides or conducting polymers) may provide much higher specific capacitances (e.g., up to one thousand farads per gram of ECS material). However, actual applications of ECS are still limited by high cost, low operation voltage, or poor rate capability, mostly because of inefficient mass transport or of slow faradic redox kinetics. Specifically, such high electrical resistance can limit the practical thickness (smallest dimension) of oxide electrodes, as increased thickness leads to increased electrode resistance, reduced charge transport and/or low power.

Consequently, in spite of extensive research and effort, making supercapacitors with high energy and power density still remains challenging. Supercapacitor electrodes of the prior art have not provided the device performance (e.g., energy density, power density, cycling stability, operating voltage) and manufacturability required for many high-performance, commercial applications.

SUMMARY OF THE INVENTION

The present invention describes supercapacitors with enhanced energy density and power density properties, achieved largely through use of electrodes that incorporate multiple types (e.g., DLS, ECS and/or battery) of electrode materials. For example, a supercapacitor according to embodiments of the present invention may comprise a first electrode formed from a DLS material coated over one portion of a charge collector, and an ECS material coated over another portion of the same charge collector. In further embodiments of the present invention, both the DLS material and the ECS material in an electrode may be in contact with a common charge collector and an electrolyte.

In certain embodiments of the present invention, a DLS material may contain a network of (e.g., electrically conductive) nanowires. Nanowires have attracted a great deal of recent attention due to their exceptional material properties. Nanowires may include, but are not limited to, carbon nanotubes (e.g., single-walled carbon nanotubes (SWNTs), multi-walled carbon nanotubes (MWNTs), double-walled carbon nanotubes (DWNTs), few-walled carbon nanotubes (FWNTs)), metallic nanowires (e.g., Ag, Ni, Pt, Au), semiconducting nanowires (e.g., InP, Si, GaN), oxide nanowires (e.g., $SiO_2$, $TiO_2$, $V_2O_5$, $RuO_2$, $MoO_3$, $MnO_2$, $CO_3O_4$, NiO), organic nanowires and inorganic nanowires. As used herein, the term "nanowire" includes any structure that has at least one dimension between about 1 nm and 100 nm, and an aspect ratio with respect to that dimension of at least 10 (e.g., a carbon nanotube with a diameter of 10 nm and a length of 1000 nm). Nanowire networks may comprise at least one interconnected network of such nanowires (e.g., wherein nanowire density of a network is above a percolation threshold).

A charge storage device according to certain embodiments of the present invention may consist of two electrodes each in contact with current collectors, and an electrolyte interposed between the electrodes. At least one of the electrodes may be formed from at least two of a DLS material, an ECS material and a battery material. A first portion of this electrode may be formed from the DLS material, ECS material and/or battery material, and may be in contact with both the corresponding current collector and the electrolyte. A second portion of this electrode may be formed from another of the DLS material, ECS material and/or battery material, and may also be in contact with both the corresponding current collector and the electrolyte. A third portion of this electrode may be formed from yet another of the DLS material, ECS material and/or battery material, and may also be in contact with both the corresponding current collector and the electrolyte.

The charge storage device may be a hybrid asymmetric supercapacitor where the other electrode is formed from a DLS material, ECS material or battery material. The charge storage device may also or alternatively be a hybrid supercapacitor where the other electrode is also formed from at least two of a DLS material, an ECS material and a battery material. This other electrode may have the same or a different structure as the electrodes described above.

The DLS materials, ECS materials and/or battery materials may be the same or different (e.g., different chemical composition, different chemical structure, different nano- and/or micro-scale structure, etc.) in the respective electrodes of charge storage devices according to certain embodiments of the present invention.

In certain embodiments of the present invention, it may be advantageous to have a multilayered electrode structure, in which a portion of a DLS material, an ECS material and/or a battery material is coated over a portion of a different DLS material, ECS material and/or battery material.

In certain embodiments of the present invention, a three-component electrode may comprise an ECS material, a highly-structured DLS material and a less-structured DLS material.

In certain further embodiments of the present invention, the supercapacitor electrodes and operating voltages are engineered such that the electrochemical capacitance is predominantly attributable to a double layer formed at the carbons and the surface of the ECS material, rather than ion insertion.

In certain embodiments of the present invention, a charge storage device electrode may be formed from a combination of the above-described embodiments.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

Features, elements, and aspects of the invention that are referenced by the same numerals in different figures represent the same, equivalent, or similar features, elements, or aspects in accordance with one or more embodiments of the system.

DETAILED DESCRIPTION OF THE EMBODIMENTS

Referring more specifically to the drawings and the description below, for illustrative purposes the present invention is embodied in the system(s), apparatus(es), and method(s) generally shown and described herein, as well as their equivalents. As used herein, the term "substantially" shall mean that at least 40% of components are of a given type.

Figure 1:
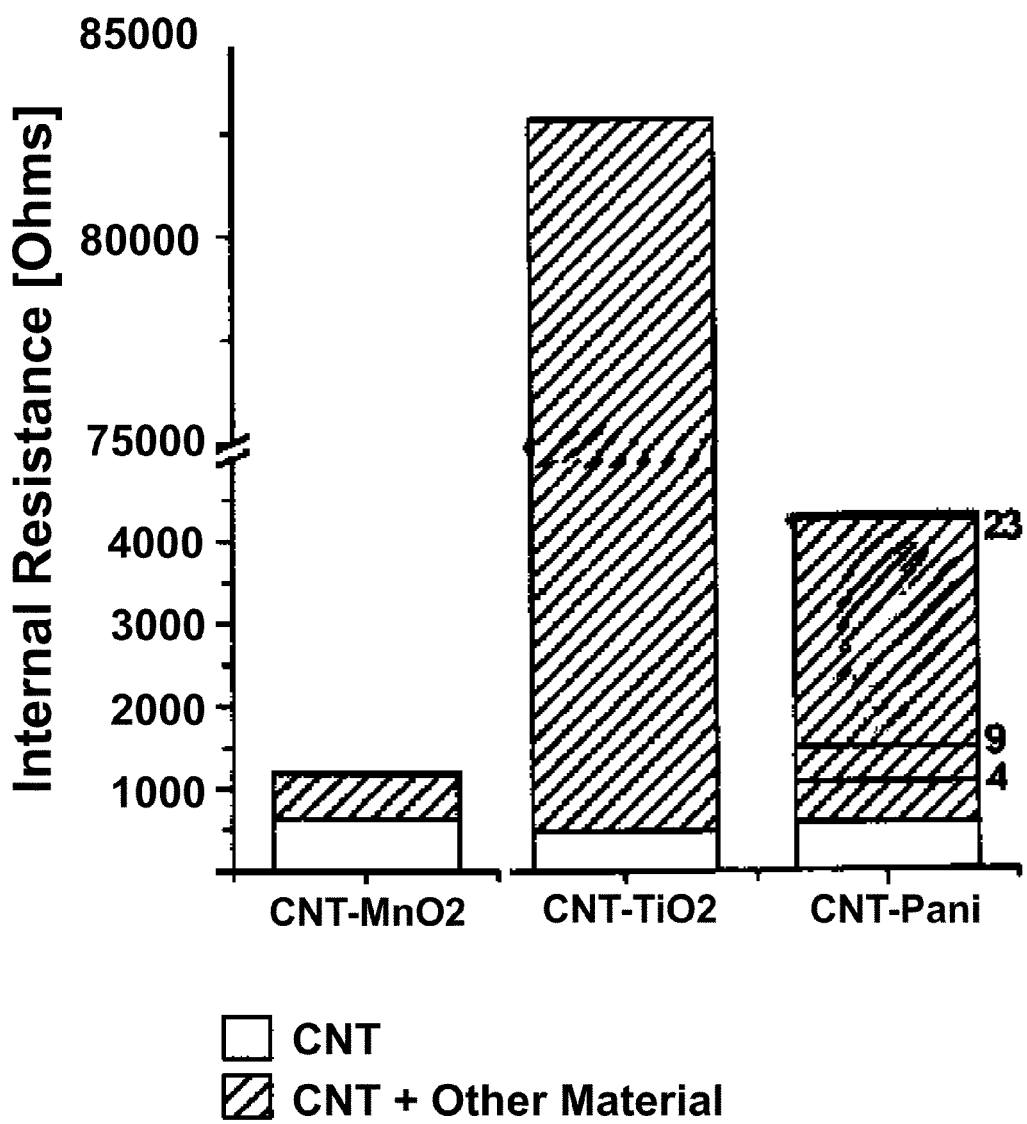
FIG. 1 is a chart of the internal resistance before and after spray-coating of an active material on top of a CNT network according to an embodiment of the present invention. A polymer electrolyte (PVA/$H_3PO_4$) was used.
Figure 2:
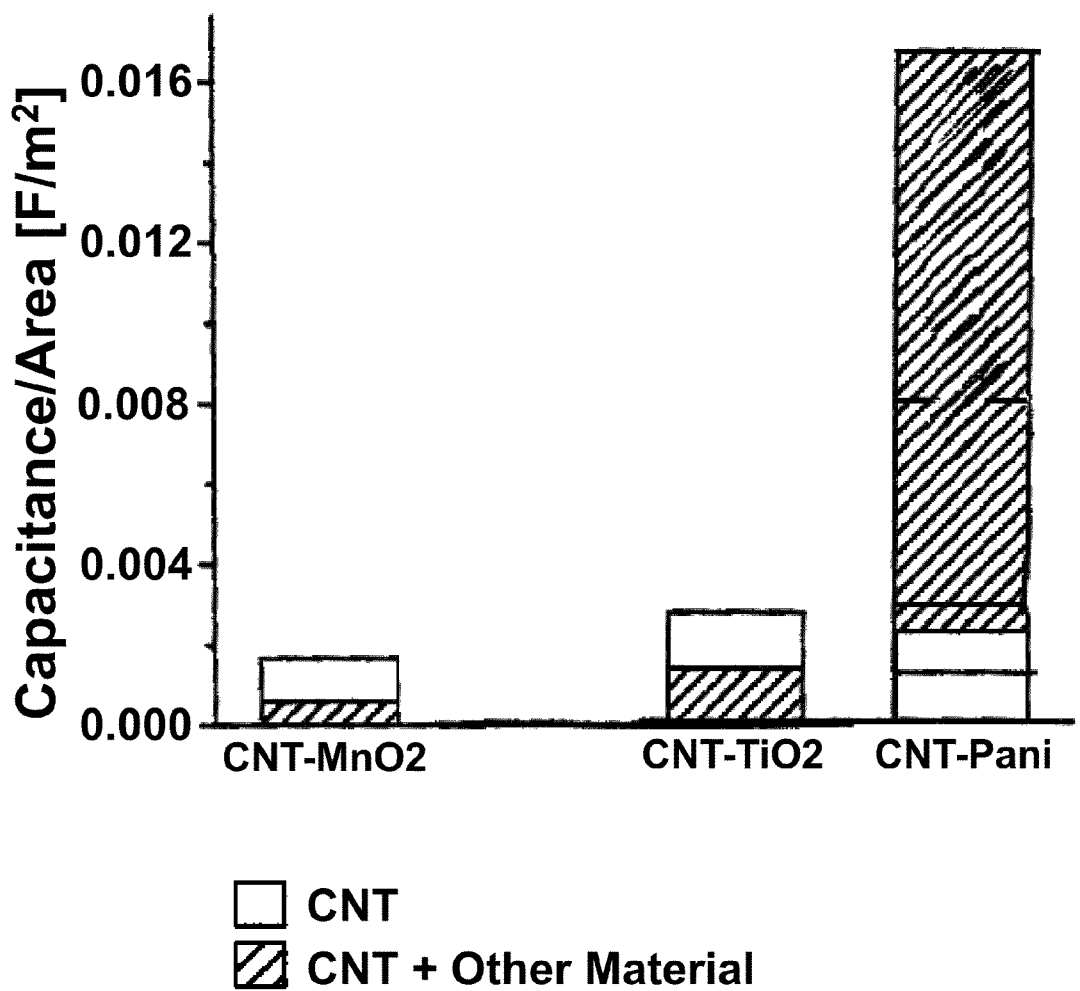
FIG. 2 is a chart of the capacitance/area before and after spray-coating of materials on top of a CNT network according to an embodiment of the present invention. A polymer electrolyte (PVA/$H_3PO_4$) was used.

Referring to FIGS. 1 and 2, internal resistance and capacitance/area measurements before and after spray-coating of a polymer electrolyte (PVA/$H_3PO_4$)) on top of a CNT network evidence the high performance of electrode materials according to certain embodiments of the present invention, for example in charge storage applications. CNTs are highly conducting nanowires that can form thin films with low sheet resistance (e.g., G. Gruner et al, J. Mater. Chem. 16, 3533 (2006)). Due to their high electrical conductivities, CNT films may act as electrode materials in intimate contact with the electrolyte; in certain embodiments of the present invention the films may also serve as a charge collector.

CNT films may serve as DLS materials in charge storage devices according to certain embodiments of the present invention. Other DLS materials within the scope of the present invention include, but are not limited to, other carbonaceous materials such as graphene flakes, activated carbon and carbon aerogel. The DLS materials are engineered to provide high energy density and fast release (or uptake) of the stored energy (or at least part of the stored energy).

Referring to FIGS. 3A, 3B, 3C and 3D, charge storage devices according to certain embodiments of the present invention have at least one electrode with both a DLS material (represented by a random network of straight lines) and an ECS material (represented by an random arrangement of circles).

Figure 3A:
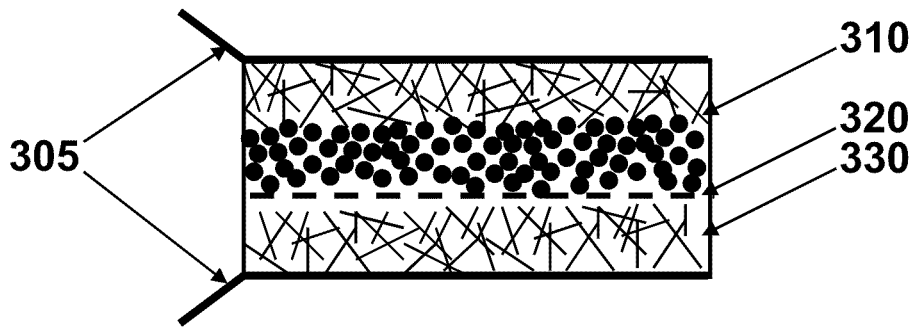
FIGS. 3A, 3B, 3C and 3D are schematic representations of certain embodiments of the present invention, wherein an energy storage device has one electrode formed of a DLS material, and another side containing both a DLS material and an ECS material.
Figure 3B:
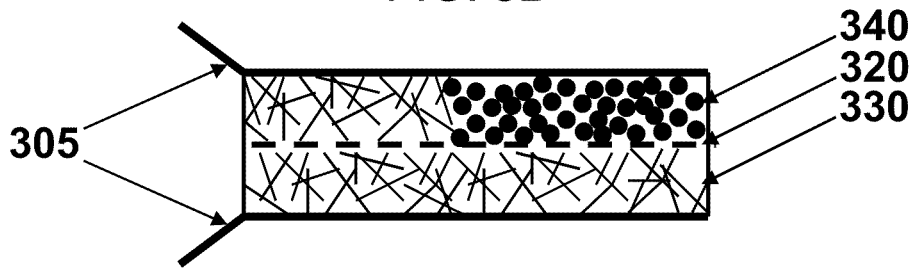
Figure 3C:
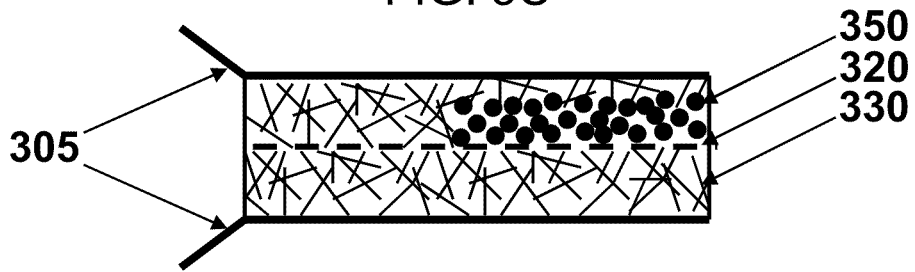
Figure 3D:
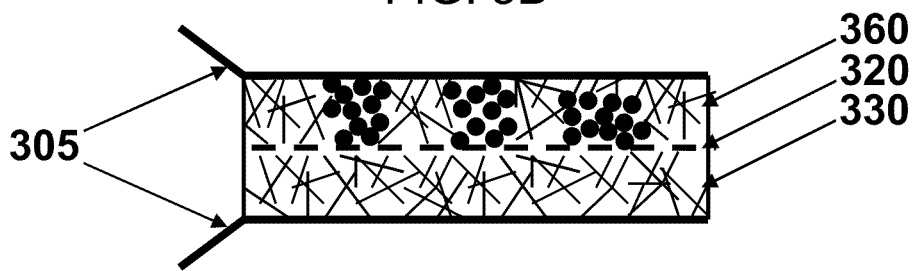

In certain embodiments of the present invention, the DLS material and ECS material form a multilayer electrode (e.g., FIG. 3A, 310). In certain embodiments of the present invention, the DLS material and ECS material may form distinct portions of the electrode, both of which are in contact with both a common charge collector 305 and a common electrolyte (e.g., FIG. 3B, 340). In certain embodiments of the present invention, it may be advantageous to retain a portion of the DLS material between a charge collector and ECS material (e.g., FIG. 3C, 350). In certain embodiments of the present invention, an electrode may contain a combination of the above-described embodiments (e.g., FIG. 3D, 360). In certain embodiments of the present invention, a charge storage device may be a hybrid asymmetric supercapacitor, in which one electrode (e.g., 310 340 350 360) comprises both a DLS material and an ECS material, while the other electrode comprises only a DLS material.

As used herein, a "portion" refers to an arbitrary continuous area of like material in the cross-sectional plane depicted in FIGS. 3A, 3B, 3C, 3D, 4A, 4B, 4C, 4D, 5A, 5B, 5C, 5D, 6A, 6B, 6C, 6D, 7, 8A and 8B. Similarly, a "thickness" of a portion of an electrode refers to the linear dimension of the portion measured along an axis extending between the charge collectors, e.g., perpendicular to the parallel segments of charge collectors 305.

In addition to electrodes, charge storage devices according to certain embodiments of the present invention may comprise a separator 320 and an electrolyte interposed between the electrodes. Although an electrolyte may penetrate a porous electrode material to reach another underlying electrode material, as used herein "contact" refers to a shared boundary between charge storage device elements (e.g., charge collector, electrolyte, electrode and portions of the electrode) in the cross-sectional plane depicted in FIGS. 3A, 3B, 3C, 3D, 4A, 4B, 4C, 4D, 5A, 5B, 5C, 5D, 6A, 6B, 6C, 6D, 7, 8A and 8B. For example, referring to FIG. 3A, electrode 310 consists of a DLS material in contact with one of the charge collectors 305 and an ECS material; and a portion of ECS material in contact with a DLS material and an electrolyte (not labeled, but presumed to be interposed between electrodes 310 330). Likewise, referring to FIG. 3B, electrode 340 consists of a DLS material and an ECS material, both of which are in contact with both a current collector 305 and the electrolyte.

Figure 4A:
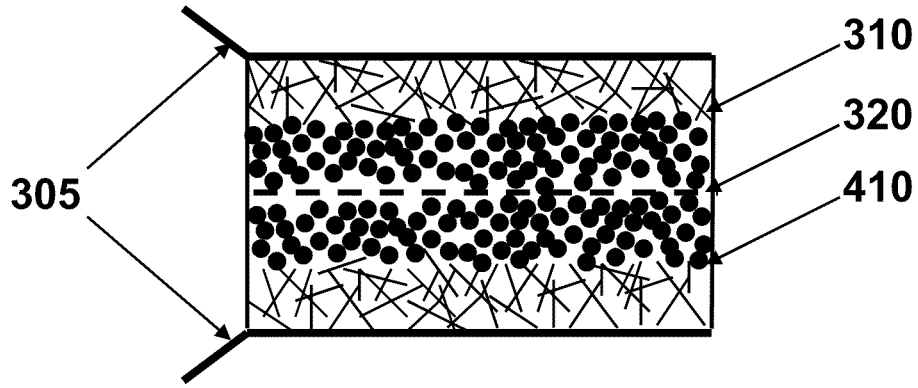
FIGS. 4A, 4B, 4C and 4D are schematic representations of certain embodiments of the present invention, wherein an energy storage device has two electrodes each containing both a DLS material and an ECS material.
Figure 4B:
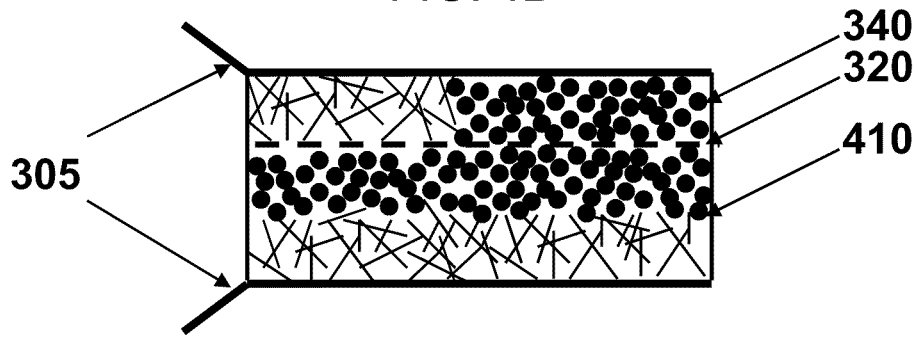
Figure 4C:
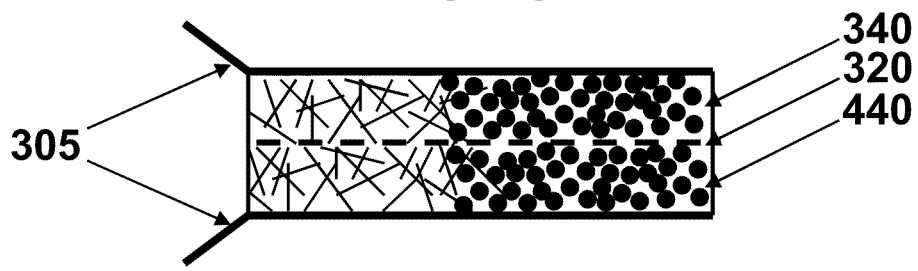
Figure 4D:
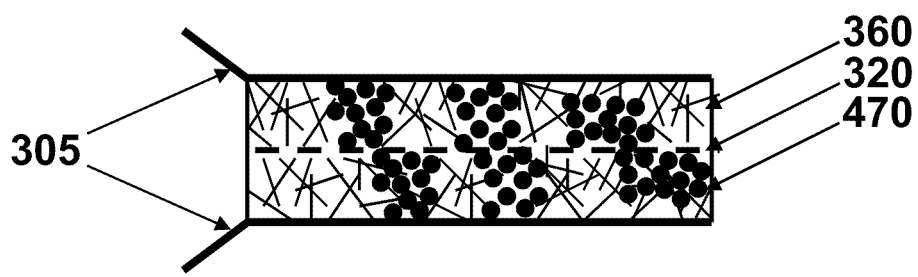
Figure 5A:
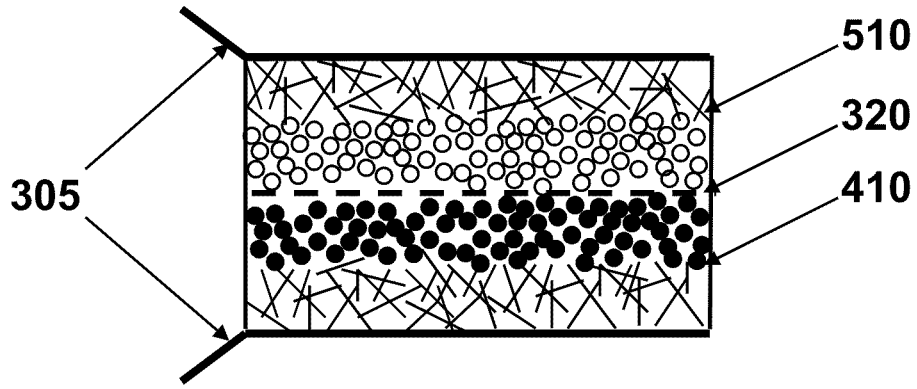
FIGS. 5A, 5B, 5C and 5D are schematic representations of certain embodiments of the present invention, wherein an energy storage device has two electrodes each containing both a DLS material and an ECS material, and wherein the DLS material and ECS material in one electrode may be of a different type than the DLS material and/or ECS material in the other electrode.
Figure 5B:
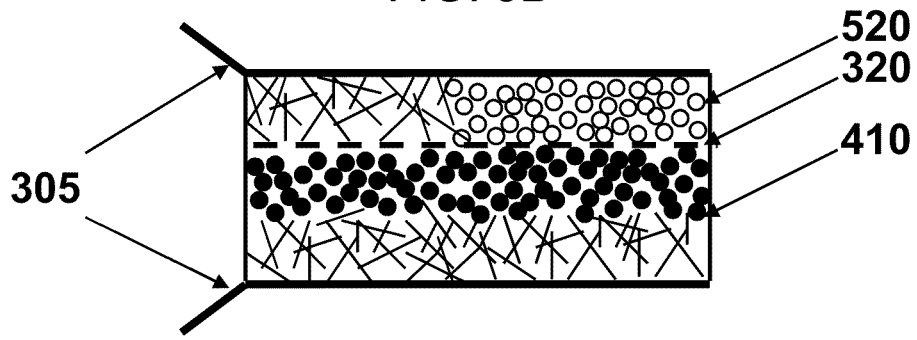
Figure 5C:
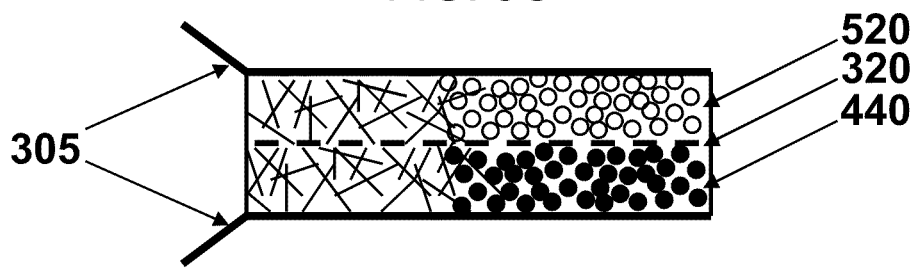
Figure 5D:
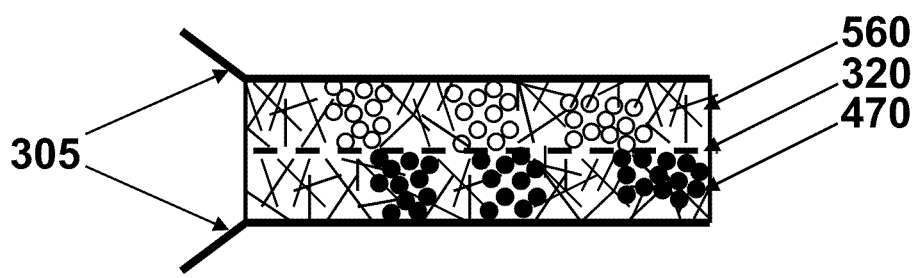
Figure 6A:
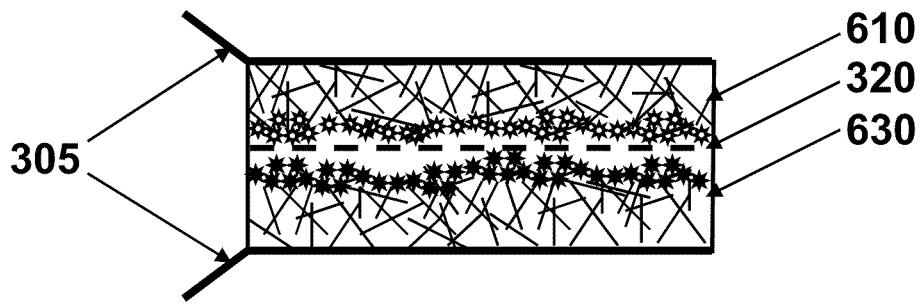
FIGS. 6A, 6B, 6C and 6D are schematic representations of certain embodiments of the present invention, wherein an energy storage device has two electrodes, each containing a DLS material, ECS material and/or battery material.
Figure 6B:
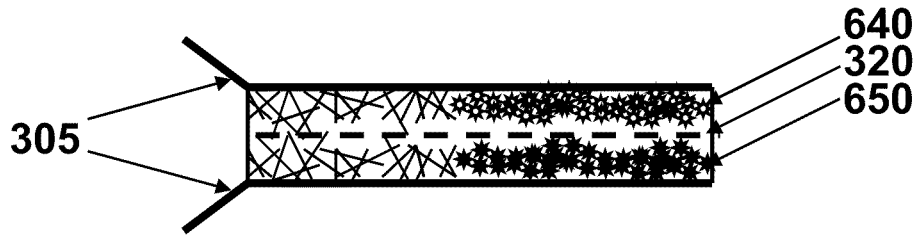
Figure 6C:
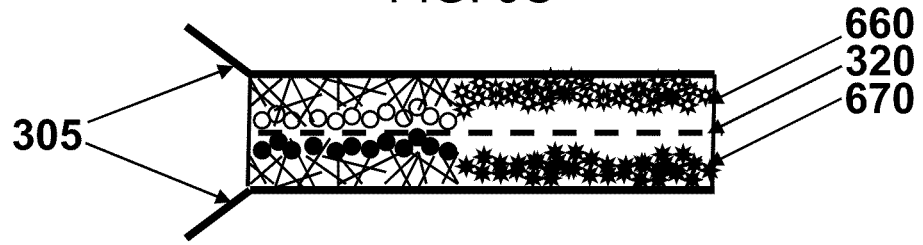
Figure 6D:
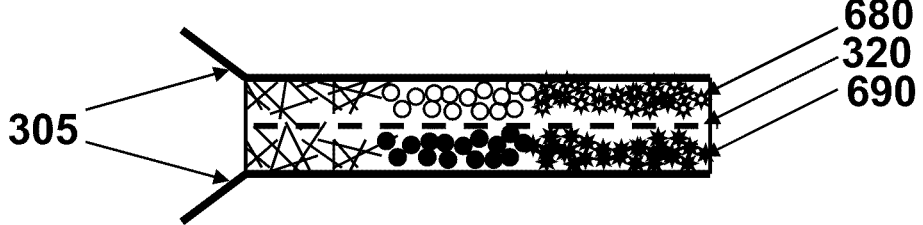

Referring to FIGS. 4A, 4B, 4C and 4D, in certain embodiments of the present invention at least two electrodes in a charge storage device may comprise both a DLS material and an ECS material. For example, the electrodes 310 410 may both have a layer of ECS material deposited over a layer of DLS material (FIG. 4A). Alternatively, one (e.g., FIG. 4B, 340) or both (e.g., FIG. 4C, 340 440) electrodes may consist of a DLS material and an ECS material, both of which are in contact with both a current collector 305 and the electrolyte. Combination electrodes (e.g., FIG. 4D, 360 470) are also within the scope of the present invention.

Referring to FIGS. 5A, 5B, 5C and 5D, in certain embodiments of the present invention the DLS material and ECS material in respective electrodes may have different chemical compositions or structures. For example, the electrodes may both have multilayer structures (e.g., FIG. 5A, 510 410), and may respectively comprise different DLS materials and/or ECS materials. Likewise, electrodes may both have a DLS material and an ECS material both in contact with a current collector 305 and electrolyte (e.g., FIG. 5C, 520 440), and may respectively comprise different DLS materials and/or ECS materials. Combinations of different electrode structures (e.g., FIG. 5B, 520 410) or combination electrodes (e.g., FIG. 5D, 560 470) that respectively comprise different DLS materials and/or ECS materials are also within the scope of the present invention.

Referring to FIGS. 6A, 6B, 6C and 6D, in certain embodiments of the present invention a charge storage device may have at least one electrode containing at least two of a DLS material, an ECS material and a battery material. For example, electrodes may comprise multilayer structures of a DLS material and a battery material (e.g., FIG. 6A, 610 630), and may respectively comprise different DLS materials and/or battery materials. Likewise, electrodes may both have a DLS material and a battery material both in contact with a current collector 305 and electrolyte (e.g., FIG. 6B, 640 650), and may respectively comprise different DLS materials and/or battery materials. Combinations of different electrode structures (e.g., FIG. 6C, 660 670) or combination electrodes (e.g., FIG. 6D, 680 690) that may respectively comprise different DLS materials, ECS materials and/or battery materials are also within the scope of the present invention.

Figure 7:
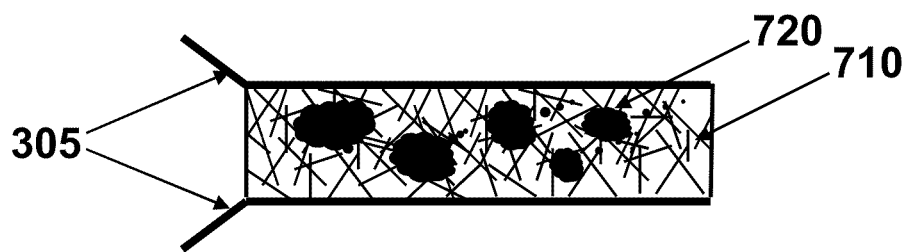
FIG. 7 is a schematic representation of an energy storage device according to an embodiment of the present invention, wherein an ECS material is interspersed within a DLS material.

Referring to FIG. 7, in certain embodiments of the present invention a charge storage device may comprise a DLS material/ECS material composite, allowing another variation of contact with the electrolyte for the two materials.

Figure 8A:
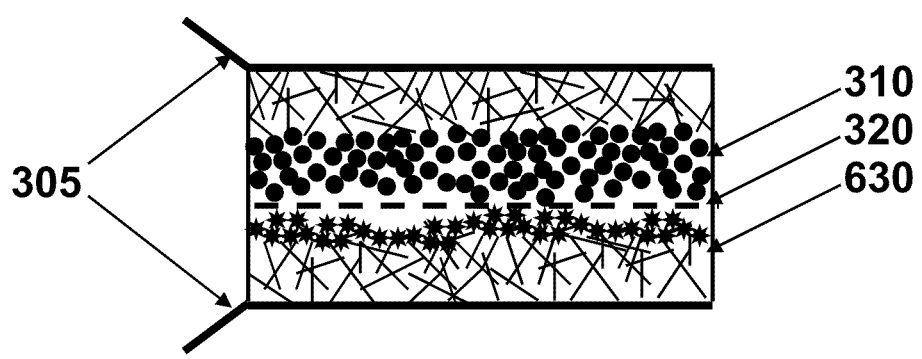
FIGS. 8A and 8B are schematic representations according to certain embodiments of the present invention, wherein an energy storage device has two electrode, each comprising a different combination of at least two of a DLS material, ECS material and battery material.
Figure 8B:
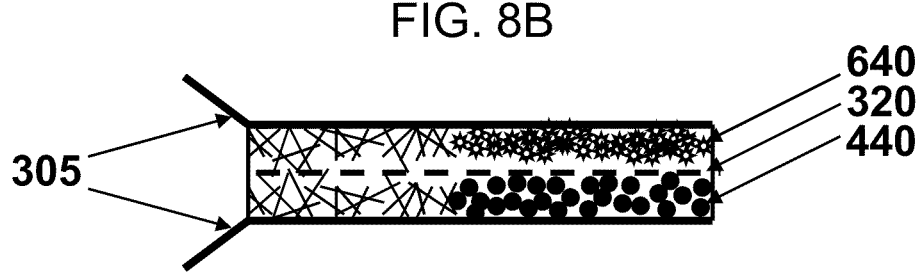

Referring to FIGS. 8A and 8B, novel electrode structures according to certain embodiments of the present invention wherein a DLS material and an ECS material (e.g., FIG. 8B, 440); a DLS material and a battery material (e.g., FIG. 8B, 640); an ECS material and a battery material (not illustrated, but within the scope of the present invention); or a DLS material, an ECS material and a battery material (e.g., FIG. 6D, 680 690) are in contact with both a common current collector 305 and electrolyte may provide performance advantages through unique power/energy outputs. DLS materials generally have relatively high power density but relatively low energy density; battery materials generally have relatively high energy density but relatively low power density; and ECS materials have intermediate energy density and power density properties. Accordingly, for example, a charge storage device having an electrode comprising a DLS material and an ECS material (e.g., FIG. 8B, 440) in contact with both a common current collector 305 and electrolyte may provide a fast energy discharge due to the DLS material component of the electrode, and also extended energy discharge due to the ECS material component of the electrode. By combining multiple electrode materials on a single charge collector in this way, such charge/discharge properties can be achieved without coupling multiple charge storage devices (e.g., a DLS and ECS), which may in turn provide weightsaving and manufacturing-cost advantages. The electrode structures described above may be engineered to provide charge/discharge properties to satisfy a variety of applications.

Separator 320 may comprise various materials. Generally, the separator provides electronic insulation between electrodes of opposite polarization, while also supporting ionic conduction from one electrode to the other. Separator 320 may be different in different embodiments of the present invention, e.g., based on the electrode materials and electrolyte(s) used in the corresponding charge storage device.

Similarly, charge collectors 305 may comprise various materials that may differ in different embodiments of the present invention, e.g., based on the electrode materials and electrolyte(s) used in the corresponding charge storage device.

Electrolytes according to certain embodiments of the present invention may differ, e.g., based on the electrode materials and operating voltages used in the corresponding charge storage device. An supercapacitor electrolyte generally contains components that can be used as mobile ionic species. For example, salts may be dissolved in a solvent; salts liquid at room temperature (ionic liquids) are also possible. Common systems include:

I. Aqueous Electrolytes

Usually, inorganic acids, bases and salts are dissolved leading to ionic species. For high conductivities, however, solutions of strong acids or bases are usually favored. Examples are given below:

a) Acids $H_2SO_4$ (aq), $H_3PO_4$ (aq), . . . .

b) Bases

KOH, NaOH, . . . .

c) Moderate pH

Solutions of any compound which dissolves to ionic species, such as salts like NaSO4, K2SO4, LiCl, . . . .

II. Organic Electrolytes a) Solvents

Ethylene Carbonate(EC), Dimethyl Carbonate (DMC), Propylene Carbonate (PC),

Diethyl Carbonate (DEC), Ethyl Methyl Carbonate (EMC), Dimethylformamide (DMF), Tetrahydrofuran (THF), -Butyrolactone, 1,3-Dioxolane (DOL), Methylacetate (MA), Glutaronitrile (GLN), . . . .

b) Salts $Et_4NClO_4$, $Et_4NBF_4$, $Et_4NPF_6$, $Et_4NAsF_6$, $Et_4NSbF_6$, $Et_4NNbF_6$, $Et_4NCF_3SO_3$, $Et_4NC_4F_9SO_3$, $Et_4N(CF_3SO_2)_2N$, $Et_4NBCH_3(C_2H_5)_3$, $Et_4NB(C_2H_5)_4$, $Et_4NB(C_4H_9)_4$, $Et_4NB(C_6H_5)_4$, $Et_4NB(C_6F_5)_4$, $LiCF_3SO_3$), $LiN(CF_3SO_2)_2$, $LiClO_4$, $LiAsF_6$, $LiBF_4$, $LiPF_6$, . . . .

III. Ionic Liquids

Room temperature ionic liquids may be quaternary ammonium salts, such as tetralkylammonium [$R_4N$]+ or based on cyclic amines, both aromatic (pyridinium, imidazolium) and saturated (piperidinium, pyrrolidinium). Low-temperature molten salts based on sulfonium [$R_3S$]+ as well as phosphonium [$R_4P$]+ cations are also known. Cations may be modified by incorporating functionalities to carbon atoms of the ring: for example incorporating nitrile to 1-alkyl-3-methylimidazolium. As well, anions may be based on cyano groups, such as [Ag(CN)$_2$]—, [C(CN)$_3$]— or [N(CN)$_2$]—. Examples are given below.

a) Imidazolium

[MeMeIm]+[N(CF$_3$SO$_2$)$_2$]—, [MeMeIm]+[CF$_3$SO$_3$]—, [MeMeIm]+[CF$_3$CO$_2$]—, [EtMeIm]+[BF$_4$]—, [EtMeIm]+[CF$_3$SO$_3$]—, [EtMeIm]+[N(CF$_3$SO$_2$)$_2$]—, [EtMeIm]+[(CN)$_2$N]—, [BuMeIm]+[BF$_4$]—, [BuMeIm]+[PF$_6$]—, [BuMeIm]+[N(CF$_3$SO$_2$)$_2$]—, [PrMeMeIm]+[N(CF$_3$SO$_2$)$_2$]—, [PrMeMeIm]+[C(CF$_3$SO$_2$)$_3$]—, . . . .

b) Pyrrolidinium

[nPrMePyrrol]+[N(CF$_3$SO$_2$)$_2$]—, [nBuMePyrrol]+[N(CF$_3$SO$_2$)$_2$]—, [nBuMePyrrol]+[N(CF$_3$SO$_2$)$_2$], . . . .

c) Tetraalkylammonium

[nMe$_3$BuN]+[N(CF$_3$SO$_2$)$_2$]—, [nPrMe$_3$N]+[N(CF$_3$SO$_2$)$_2$]—, [nOctEt$_3$N]+[N(CF$_3$SO$_2$)$_2$]—, [nOctBu$_3$N]+[N(CF$_3$SO$_2$)$_2$]—, . . . .

d) Pyridinium

[BuPyr]+[BF$_4$]—, [BuPi]+[N(CF$_3$SO$_2$)$_2$]—, . . . .

e) Piperidinium

[MePrPip]+[N(CF$_3$SO$_2$)$_2$]—, . . . .

f) Sulfonium

[Et$_3$S]+[N(CF$_3$SO$_2$)$_2$]—, [nBu$_3$S]+[N(CF$_3$SO$_2$)$_2$]—, . . . .

IV. Polymer/Gel Electrolytes

Many of the above mentioned types of electrolytes can be mixed with a polymer leading to so-called polymer- or gel electrolytes. Here, the electrolyte is trapped in the pores of the polymer resulting in thin rather solid electrolyte films. Typical polymers for such purpose are listed below:

PEO [poly(ethylene oxide)], PAN [poly(acrylonitrile)], PVA [poly(vinyl alcohol)], PMMA [poly(methyl methacrylate)], PVDF [poly(vinylidene fluoride)], PVC [poly(vinyl chloride)], MEEP [poly[bis(methoxy ethoxy ethoxyphosphazene)], PVS [poly(vinyl sulfone)], PVP [poly(vinyl pyrrolidone)], PPO [poly(propylene oxide)], . . . .

V. Multiple Electrolytes

Electrolytes that are the mixture of electrolytes listed above can be used of optimization of the response.

Example 1

A Carbon Nanotube Film as DLS Material

In certain embodiments of the present invention, a charge storage device may comprise a CNT film as a DLS material.

SWNTs were dissolved in pure water (1-2 mg/ml) with the aid of a tip sonicator. Using an air brush pistol the stable suspension was sprayed onto overhead transparencies (polyethylene-therephthalate, PET) which were placed on a heating plate at ~100° C. During spraying, the water evaporates and the CNTs form an entangled random network on the PET. Afterwards the CNT coated PET substrates were used as the carbonaceous nanostructured network (DLS material) without any further treatment.

A polymer electrolyte was prepared by mixing polyvinyl alcohol (PVA) with water (1 g PVA/10 ml $H_2O$) and subsequent heating under stirring to ~90° C. until the solution becomes clear. After cooling down, conc. phosphoric acid was added (0.8 g) and the viscose solution was stirred thoroughly. Finally, the clear solution can be cast into a Petri dish where it was left to let excess water evaporate. Once the polymer electrolyte ($H_3PO_4$/PVA) is hard, it was cut into pieces serving as both electrolyte and separator in our devices. The $H_3PO_4$/PVA was relatively thick (~1.2 mm) but can be easily decreased by changing the PVA/Water ration and using printing techniques. Liquid electrolytes of 1M solutions of $H_3PO_4$, $H_2SO_4$, and NaCl were prepared for comparison. For the device assembling, the CNT coated PET substrates were sandwiched together separated by a piece of polymer electrolyte.

Example 2

Carbonaceous Networks Together with ECS Materials

Use of a DLS material in combination with an ECS material in a charge storage device electrode may take advantage of both the high conductivity of the CNT networks and the high specific capacitance of the coating potentially increasing the capacitance of CNT networks. The ECS material was sprayed on top of the CNT networks. In such a multiple network the CNT network can act not only as a DLS material, but also as a current collector (e.g., where the additional ECS material coating is the active material). This multilayer structure is fundamentally different from composites where all materials (e.g., DLS material and ECS material) are mixed together, potentially interrupting the current conducting paths within the CNT network. The performance of these multiple networks is evidenced in FIGS. 1 and 2 in terms of internal resistance and capacitance/area, respectively.

When using inorganic coatings as an ECS material, here $MnO_2$ and $TiO_2$, the capacitance decreased compared to the not-coated CNT network. This is in contrast to many publications where high capacitances for these materials have been reported, explained by additional Faradaic reactions. However, such pseudocapacitive contributions depend strongly on the electrode/electrolyte combination used. Hence, the electrode/electrolyte system used here may be optimized to take advantage of the pseudocapacitive contributions of such coatings.

When using Polyaniline coatings as an ECS material, the capacitance increased significantly. This can be explained by a higher surface area and pseudocapacitive contributions (in particular for polyaniline). The polyaniline coating leads to the highest capacitance of all materials investigated. But the values may not be reproducible since polyaniline can degrade when higher voltages are applied. Consequently, the capacitance can decrease after a few charge/discharge cycles. Carbon Black may be a promising active material for the multiple network concept—the high conductivity of the CNT network and the very high surface area of the a-C may combine to provide a maximum performance in a reliable device.

Example 3

Electrode Device with CNT and Carbon/Polyaniline (PANI) Electrodes

In an experimental embodiment of the present invention, a three-layer structure, with CNTs as one electrode and a two-layer CNT/polaniline (PANI) structure as a second electrode, was fabricated and compared with a symmetric DLS architecture with two electrodes formed from CNTs.

Figure 9A:
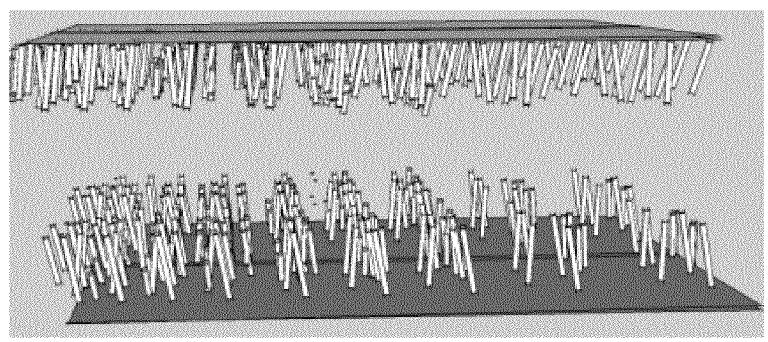
FIGS. 9A and 9B are schematic representations according to certain embodiments of the present invention, wherein (9A) two CNT electrodes are employed, and (9B) one PANI/SWNT electrode and one CNT electrode are employed (i.e., in an asymmetric supercapacitor). A 1M $H_3PO_4$ may be used as an electrolyte in these systems.
Figure 9B:
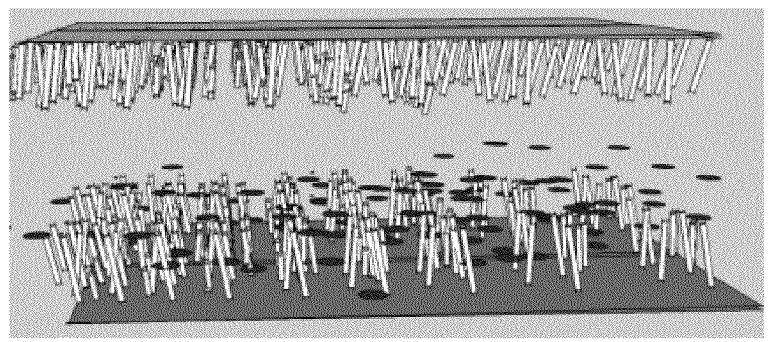

A SWNT suspension (1.0 mg CNTs/ml in deionized water) was sprayed onto polyethyletherephthalate (PET) which was heated at temperature about 120° C. The spayed film was ready to use as a working electrode in the PANI electrodeposition; its resistance was around 100Ω as measured by a two-probe multi-meter. The thickness of the SWNT film was roughly 1 μm. The electrodeposition of PANI was carried out using a three-electrode electrochemical cell with an Ag/AgCl reference electrode and a platinum sheet as the auxiliary electrode. The PANI film was electrodeposited using cyclic sweep with a GiIIAC device (AutoAC, ACM Instruments, UK) in 0.8M $H_2SO_4$ electrolyte. Two supercapacitor configurations were produced in this experimental embodiment. Referring to FIG. 9A, in one configuration the supercapacitor comprised CNT films as both electrodes; referring to FIG. 9B, in one configuration one electrode comprised a CNT film while another electrode comprised a PANI/CNT structure.

Figure 10A:
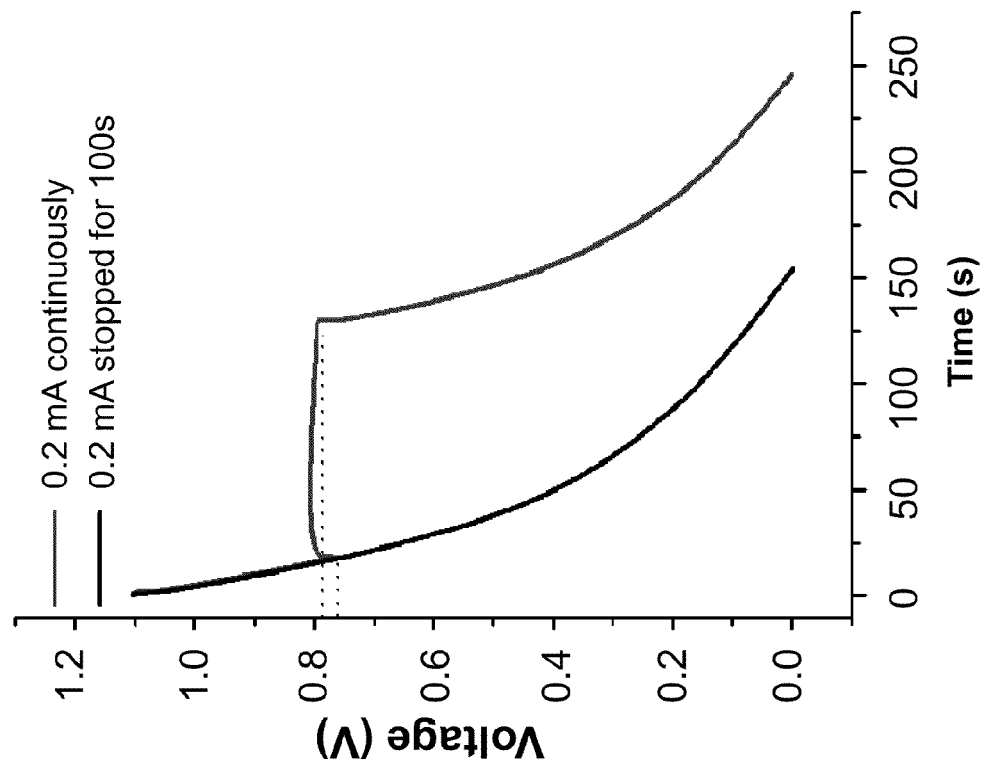
FIGS. 10A, 10B, 10C and 10D are graphs of the continuous discharge and two-step discharge of SWNT supercapacitors (10A, 10B) and PANI/CNT-CNT asymmetric supercapacitors (10C, 10D), according to certain embodiments of the present invention.
Figure 10B:
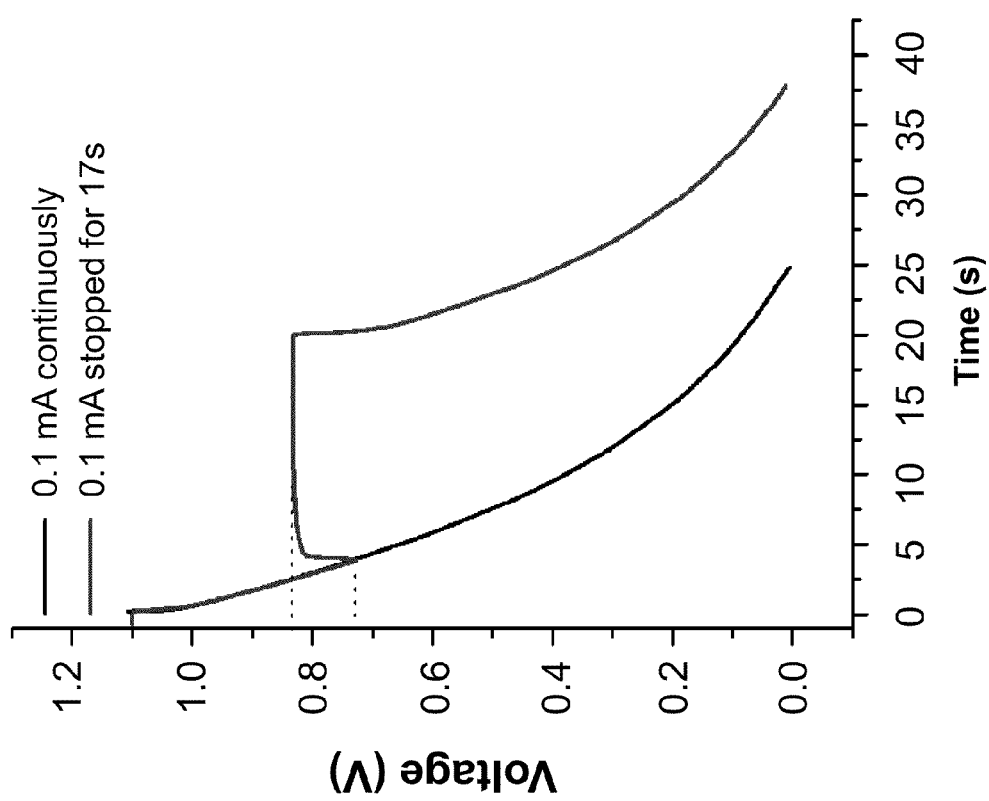
Figure 10D:
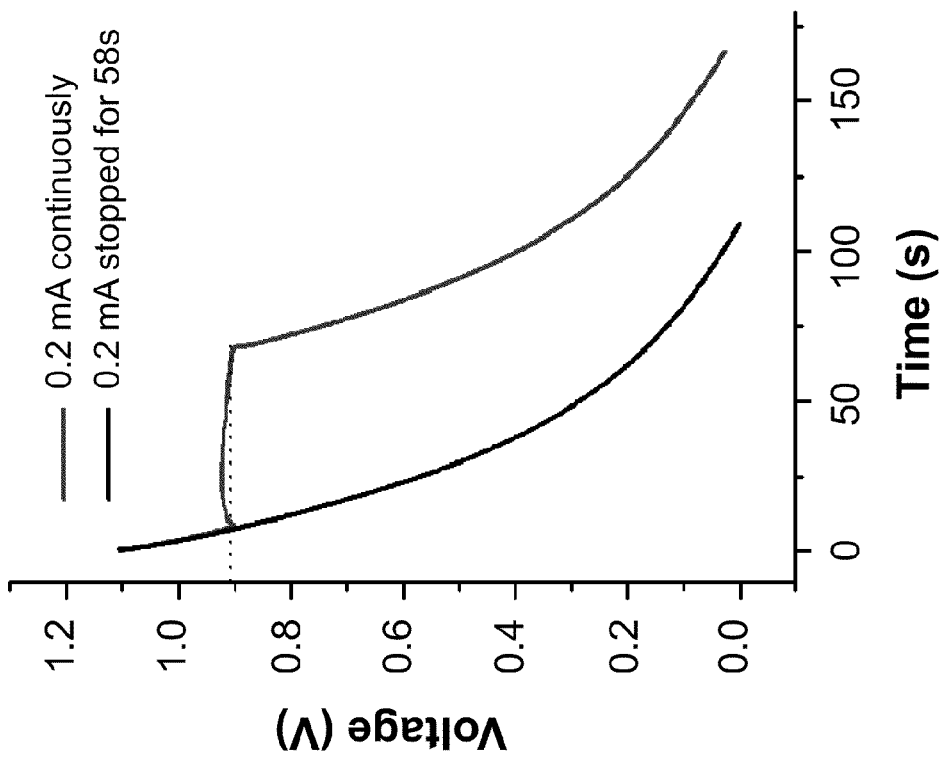
Figure 10C:
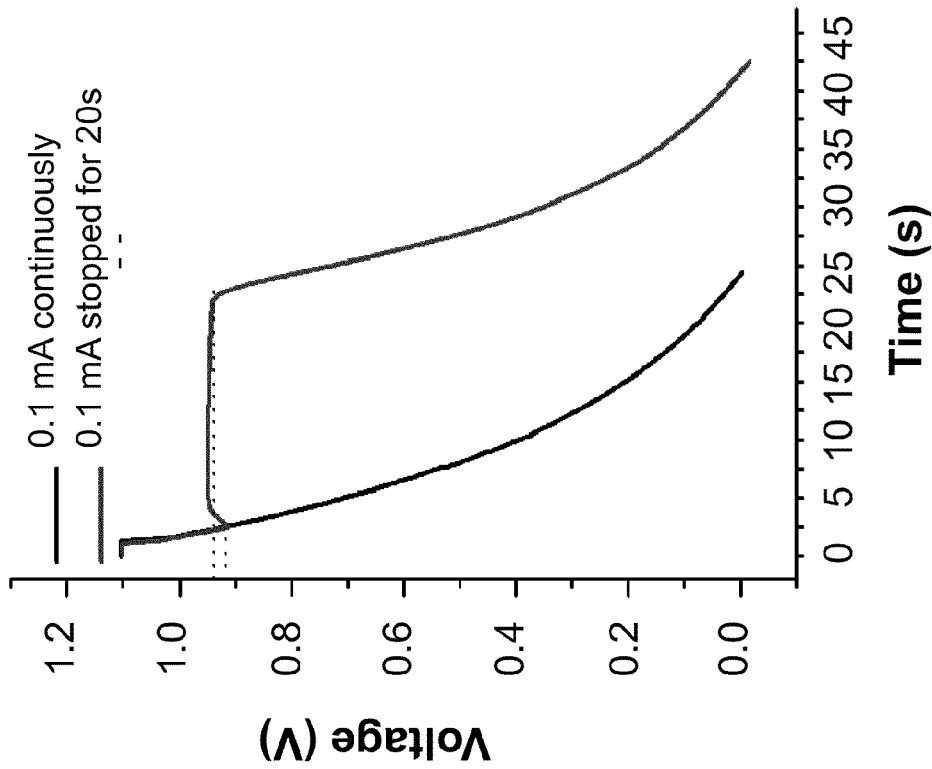

Referring to FIGS. 10A, 10B, 10C and 10D, both of the aforementioned configurations were studied using two discharge currents, 0.1 mA and 0.02 mA. In general, the total charges calculated based on Q=It for continuous and two-step (discharge-stop-discharge)) discharge processes were quite similar to each other. For example, for the CNT discharge process using a current of 0.1 mA (FIG. 10C), the continuous discharge lasted for about 24 seconds, while the total discharge time for two-step process was about 22 seconds. FIG. 10A indicates that after 17 seconds of suspension, the two-step discharge of the PANI/CNT asymmetric device resumed with an instantaneous voltage 0.1V higher than the last instantaneous voltage before the suspension. It should be emphasized also that this voltage increase of 0.1V is almost 10% of the instantaneous voltage just before the discharge suspension, which means that the instantaneous power could soar, for example, up to 10% higher with an additional electrochemical PANI layer. At a lower discharge current of 0.02 mA (FIG. 10B), the instantaneous voltage jump of PANI/CNT electrode is about 0.03V. The difference is understandable since the usage of the stored charge would be greater at a lower current discharge, and thus a smaller amount of charge was left once discharge was restarted. FIGS. 10C and 10D show the discharge processes for the CNT symmetric supercapacitors, in which the instantaneous voltage jump due to the discharge suspension is very insignificant. Referring to FIG. 2C, the instantaneous voltage of the CNT electrode is only about 0.01V higher after 20 seconds of pause and at 0.02 mA; the instantaneous voltage remained at the same level even after 100 s of pause. This comparison between PANI/CNT asymmetric supercapacitor (FIGS. 10A and 10B) and SWNT symmetric device (FIGS. 10C and 10D) suggests that the increment of the power is determined largely by the electrochemical layer rather than the double layer. A hypothesis can be proposed that the ECS material could significantly change the instantaneous power, while the DLS material could sustain power at a certain level. In other words, the ECS material could provide an additional acceleration function, especially after a break, and this function may be advantageous for the electric vehicles. Considering the large self-discharge rate between the PANI and CNT materials, the instantaneous power could be further improved when optimized PANI/CNT electrodes with reduced self-discharge rate are applied.

Electrode materials (e.g., DLS material, ECS material, battery material) according to certain embodiments of the present invention may include, but are not limited to:

a) Metal and Metal Oxides:

Zn, Co, Ni, Li, Ru, $TiO_2$, $PbO_2$, $RuO_2$, $IrO_2$, $MnO_2$, $Fe_3O_4$, $In_2O_3$, $WO_3$, $SnO_2$, $V_2O_5$, $Ni(OH)_2$, $Ni(OOH)$, $LiCoO_2$, $Li4Ti_5O_{12}$, $Ir0._3Mn0._7O_2$, etc.

b) Carbon Materials:

All types of synthetic and natural carbon structures and its derivatives such as Graphite, Carbon Black, Carbon Nanotubes, Fullerenes, Activated Carbons, Carbon Cloths, Foams, Aerogels, etc.

c) Conducting Polymers:

Polyaniline, Polythiophene, Polypyrrol, PEDOT, etc.

Example 4

Device Containing Materials with Supercapacitor and Battery Functionality

In one embodiment of the present invention one can specifically use single wall carbon nanotubes (SWNTs) as a DLS material. The following device has been fabricated and tested: a battery device with a DLS functionality based on the $MnO_2$-Zinc system. The charge collector on one side consisted of a thin film of CNTs created by a filtration process. An additional layer is formed thereon by mixing the $MnO_2$ powder with CNTs (MnO$_2$:SWCNT=1:20 (weight:weight) in this case) resulting in a high conductivity and providing conducting paths to the charge collector for the electrons produced in the chemical reaction. The anode was a zinc powder or a zinc powder mixed with SWCNTs. A standard electrolyte (NH$_4$Cl:ZnCl$_2$:H$_2$O=26%:8.8%:65.2% weight) completed the device. Both the separator and the cathode mix were soaked in electrolyte and all layers described above were in contact with the electrolyte.

Battery materials according to certain embodiments of the present invention include, but are not limited to:

Zinc-Carbon Batteries:
Active materials: Zinc (Zn) and manganese dioxide (MnO$_2$).
Electrolyte: Instead of the described electrolyte (NH$_4$Cl, ZnCl$_2$ and water), one could use either ZnCl$_2$ in water (without NH$_4$Cl) or an aqueous solution of KOH (alkaline battery).
Zinc/Air Batteries:
Active materials: Zinc (Zn) and oxygen (O$_2$, air).
Electrolyte: KOH (aqueous solution).
Mg/MnO$_2$ Batteries:
Active materials: Magnesium (Mg) and manganese dioxide (MnO$_2$).
Electrolyte: Aqueous solution of MgBr$_2$ and Mg(ClO$_4$).
Zn/HgO Batteries
Active materials: Zinc (Zn) and mercury oxide (HgO).
Electrolyte: KOH or NaOH (aqueous solutions).
Aluminum Batteries:
Active materials: Aluminum (Al) and oxygen (O$_2$, air).
Electrolyte: several possible electrolytes, including aqueous KOH.
Cd/HgO Batteries:
Active materials: Cadmium (Cd) and mercury oxide (HgO).
Electrolyte: KOH (aqueous solution).
Zn/Ag$_2$O Batteries:
Active materials: Zinc (Zn) and silver oxide (Ag$_2$O or AgO).
Electrolyte: KOH or NaOH (aqueous solutions).
Lithium Batteries:
Active materials: Lithium (Li) and sulfur dioxide (SO$_2$), manganese dioxide (MnO$_2$), FeS$_2$.
Electrolyte: Organic solvent, salt solution or SOCl$_2$ with AlCl$_4$ respectively.
Solid State Batteries:
Active materials: Lithium (Li), I$_2$(P$_2$VP).
Electrolyte: solid
Secondary Batteries
Lithium Ion Batteries:
Active materials: Lithium-metal-oxides (such as LiCoO$_2$, Li$_1$-xCo$_1$-yMyO$_2$ etc.) or phosphate based (e.g. LiFePO$_4$, Li$_3$V$_2$(PO$_3$)$_3$) and usually carbon (sometimes nitrides, sulfides, phosphides or oxides such as CuO)
Electrolyte: lithium-salt electrolytes (such as LiPF$_6$, LiBF$_4$, or LiClO$_4$) in organic solvents (aqueous or as polymer electrolytes).
Silver-Zinc Batteries:
Active materials: Zinc (Zn) and silver oxide (AgO).
Electrolyte: KOH (aqueous solution).
Zinc-Carbon:
Active materials: Zinc (Zn) and manganese dioxide (MnO$_2$).
Electrolyte: KOH (aqueous solution).
Lead-Acid Batteries:
Active materials: Lead (Pb) and lead dioxide (PbO$_2$).
Electrolyte: H$_2$SO$_4$ (aqueous solution).
Nickel-Cadmium Batteries:
Active materials: Cadmium (Cd) and NiOOH.
Electrolyte: KOH (aqueous solution).
Nickel-Iron Battery:
Active materials: Iron (Fe) and NiOOH.
Electrolyte: KOH (aqueous solution).
Nickel-Metal Hydride Battery:
Active materials: Metal hydride (MH) and NiOOH.
Electrolyte: KOH (aqueous solution).
Nickel-Zinc Battery:
Active materials: Zinc (Zn) and NiOOH.
Electrolyte: KOH (aqueous solution).
Nickel-Hydrogen Battery:
Active materials: Hydrogen (H$_2$) and NiOOH
Electrolyte: KOH (aqueous solution).
Polymers:
Active materials: Organic functional polymers.

Example 5

Three-Component Electrodes

Figure 11A:
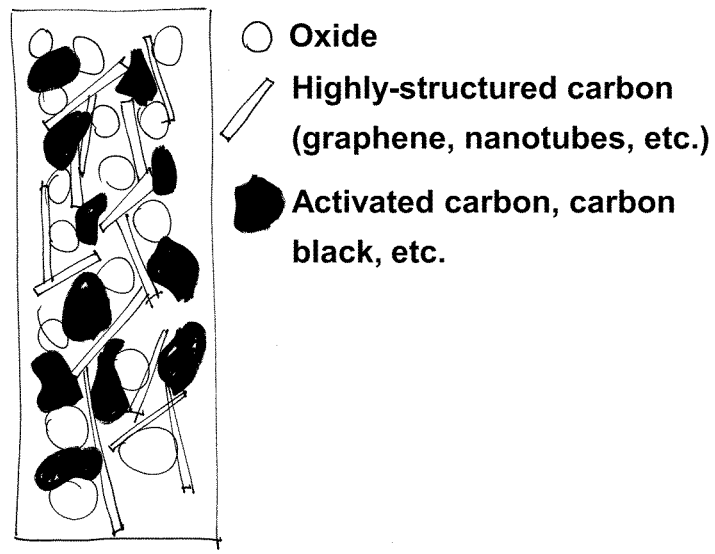
FIGS. 11A and 11B are schematic representations of three-component electrodes according to certain embodiments of the present invention.

Referring to FIG. 11A, electrodes according to certain embodiments of the present invention may comprise three different material and structural components ("three-component electrodes"), for example an ECS material (e.g., metal oxide nanoparticles or nanowires), a highly-structured DLS material (e.g., electrically-conducting nanowires or other nanostructured carbon (graphene)) and a less-structured DLS material (e.g., activated carbon, carbon black). Those of ordinary skill in the art will understand that, as referred to herein, "structured" refers to the lattice structure of a material, where "more-structured" indicates a relatively long-range crystalline structure and "less-structured" indicates a relatively amorphous structure.

Figure 11B:
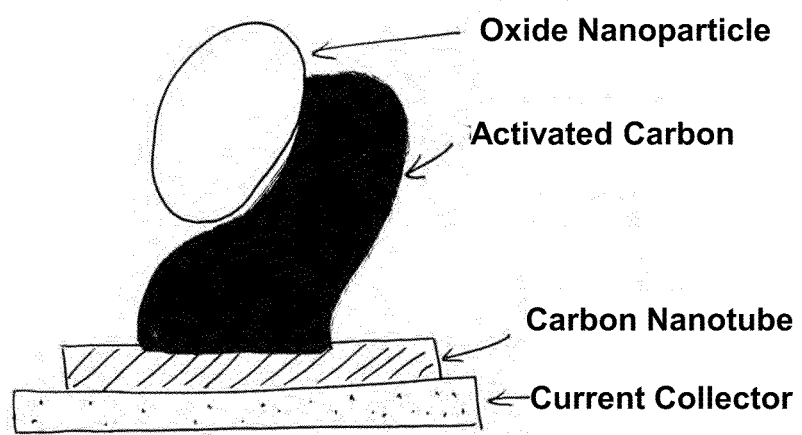

Referring to FIG. 11B, three-component electrodes according to certain further embodiments of the present invention are structured such that the less-structured DLS component (e.g., activated carbon) forms an electrically conductive pathway between the ECS material (e.g., oxide nanoparticle) and the highly-structured DLS component (e.g., carbon nanotube).

Due to its less-structured form, activated carbon or carbon black can make improved electrical (e.g., more conformal physical) contact between the ECS and highly-structured DLS components of the electrode, which improved charge transport in our experimental devices. In one such experimental device, TiO$_2$ nanoparticles (average dimension less than 10 nm) were combined with activated carbon and P3 SWNTs from Carbon Solutions.

In an experimental embodiment of the present invention, Polyvinylidene fluoride (PVDF) was dissolved in N-methyl-2-pyrrolidone (NMP) at a concentration of 5 mg/ml to create a stock solution of polymer binder. Slurry was then prepared by mixing 60-70 wt % activated carbon material with 10-20 wt % oxide material (TiO$_2$ in ethanol), 10 wt % carbon filler (carbon black and/or carbon nanotubes) and 10 wt % of PVDF binder from stock solution (not including mass of NMP). Electrodes were also prepared without oxide material and containing 80% activated carbon for use in an asymmetric supercapacitor device. Slurry was heated to 100° C. in an oven for approximately 1 hour to remove excess ethanol and then sonicated in a sonic bath for a further 1 hour. If the slurry prepared was too viscous, extra NMP was added as required, followed by further sonication until it became smooth and free-flowing. Typical solid to liquid concentration was 50-100 mg/ml. The slurry was then drop cast onto a 1 cm$^2$ area on a stainless steel plate current collector (10 mm×50 mm) for flooded cell set-up, and/or on 12.57 mm diameter steel disc for a Swagelok set-up. Electrode mass was tailored reasonably accurately by varying the volume of slurry dropped with typically 1-3 mg active material applied to each electrode. NMP was then evaporated by heating in an oven for a period of 2 hours to leave a robust electrode and the electrode mass was accurately measured using a mass balance.

The resulting electrodes were then tested. Organic electrolyte was prepared by dissolving lithium perchlorate ($LiClO_4$) in propylene carbonate (PC) to get a 1M solution. Electrolyte was prepared and electrodes were measured in an inert atmosphere ($N_2$). Cyclic voltammetry (CV) and galvanostatic charge-discharge (GC) cycles were typically measured at a voltage range of 0-2.8 V. CV was usually performed at scan rates from 0.5-20 mV/s and GC with a current of between 0.1-20 A/g. In a typical symmetric supercapacitor set-up, two equivalent electrodes with equal mass (1:1 ratio) were measured. For an asymmetric measurement the positive electrode contained no oxide material while the negative electrode contained oxide material. Typically the mass ratio was 1:1; however nonequivalent mass ratios were also measured.

Figure 14A:
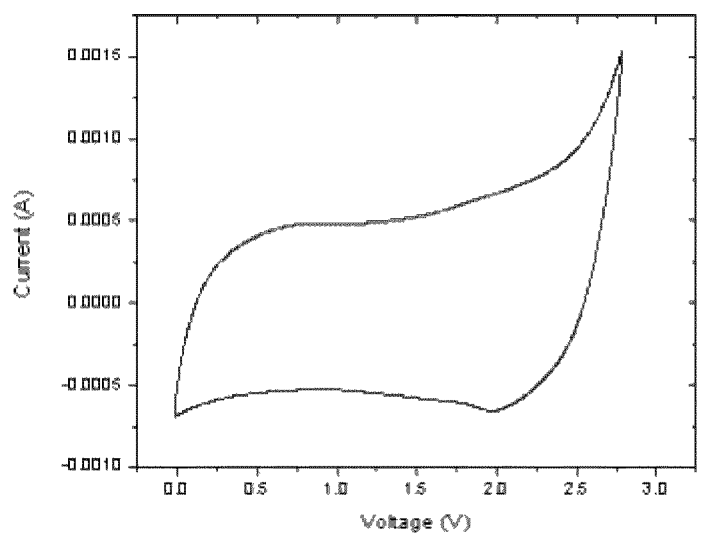
FIGS. 14A and 14B are graphs of, respectively, the cyclic voltammetry (CV) and galvanostatic discharge (GC) curves for a symmetric supercapacitor with three-component electrodes according to an experimental embodiment of the present invention.
Figure 14B:
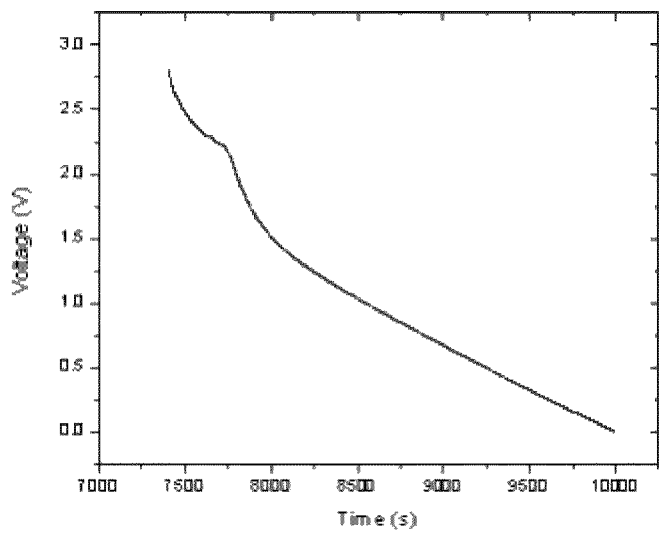
Figure 15A:
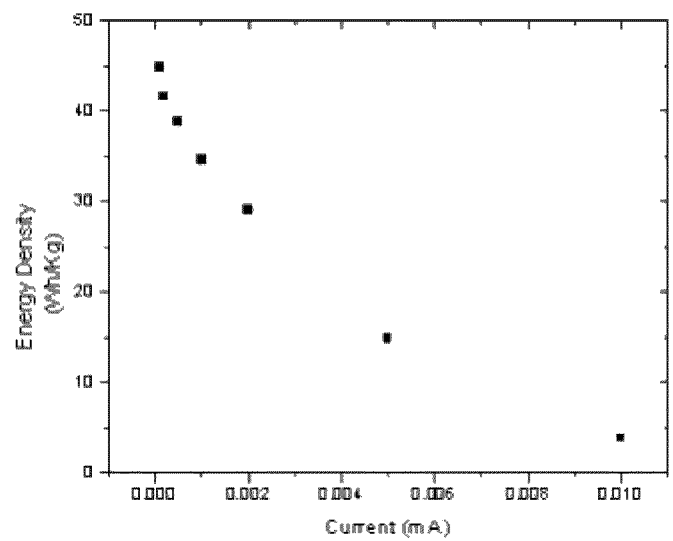
FIGS. 15A and 15B are graphs of, respectively, energy and power density for a symmetric supercapacitor with three-component electrodes according to an experimental embodiment of the present invention.
Figure 15B:
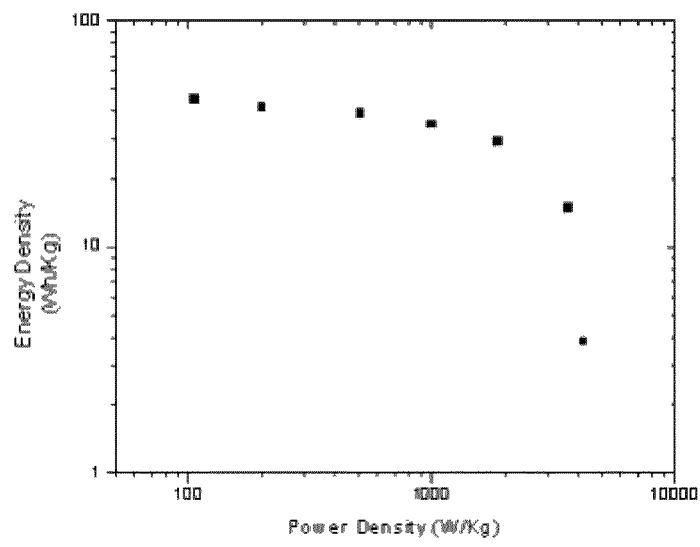

FIGS. 14A and 14B display the cyclic voltammetry and galvanostatic discharge results for experimental embodiments of the present invention, specifically a symmetric supercapacitor as described above, while FIGS. 15A and 15B show the corresponding energy and power density.

In certain further embodiments of the present invention, the supercapacitor electrodes and operating voltages are engineered such that the electrochemical capacitance is predominantly attributable to a double layer formed at the surface of the electrode (e.g., surface of carbons and oxide). In many traditional oxide supercapacitors (e.g., those based on $V_2O_5$), charge storage is achieved through insertion of the ions (say Li+) into the electrode material, and this ion insertion ultimately limits the power and lifetime of the supercapacitor. In contrast, supercapacitors according to certain embodiments of the present invention may be engineered such that ions are not inserted into the electrode to store charge, but rather form a double layer at the electrode surface. For example, in the experimental three-component electrode described above, tests revealed that charge was stored in a double layer at the $TiO_2$ surface at operating voltages below 2.8V, but above 2.8V ions were gradually inserted into the $TiO_2$ leading to degradation and decreased performance.

Figure 13:
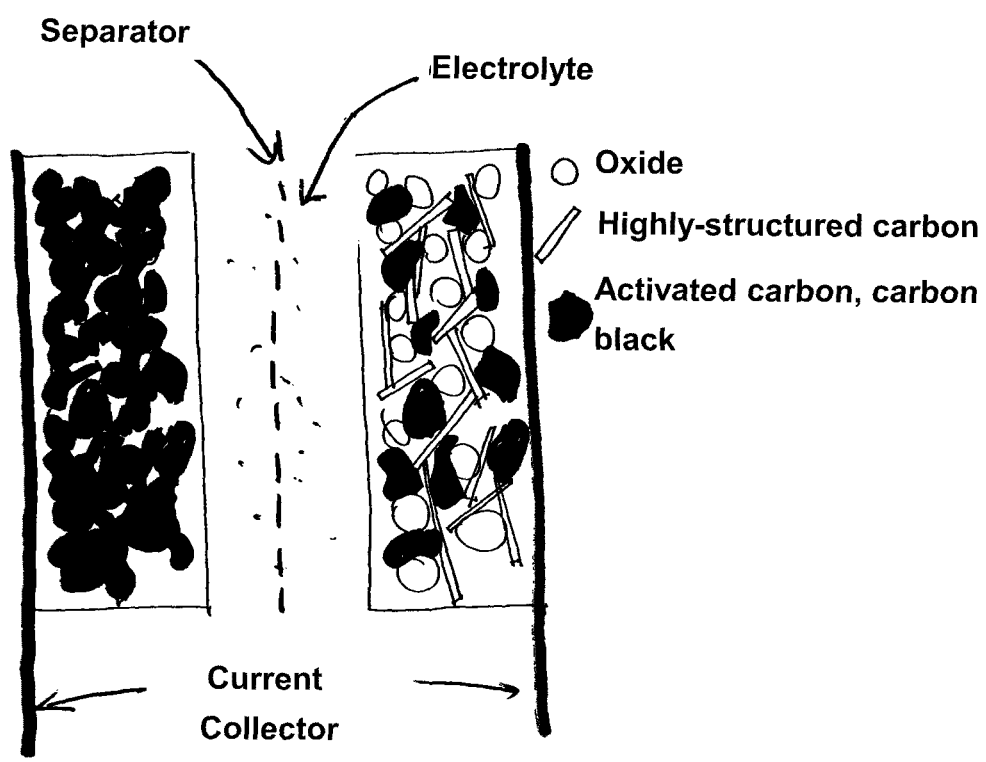
FIG. 13 is a schematic representation of an asymmetric supercapacitor with a three-component electrode according to certain embodiments of the present invention.

Referring to FIG. 13, in certain further embodiments of the present invention, three-component electrodes as described above may be incorporated into asymmetric supercapacitors.

Figure 12:
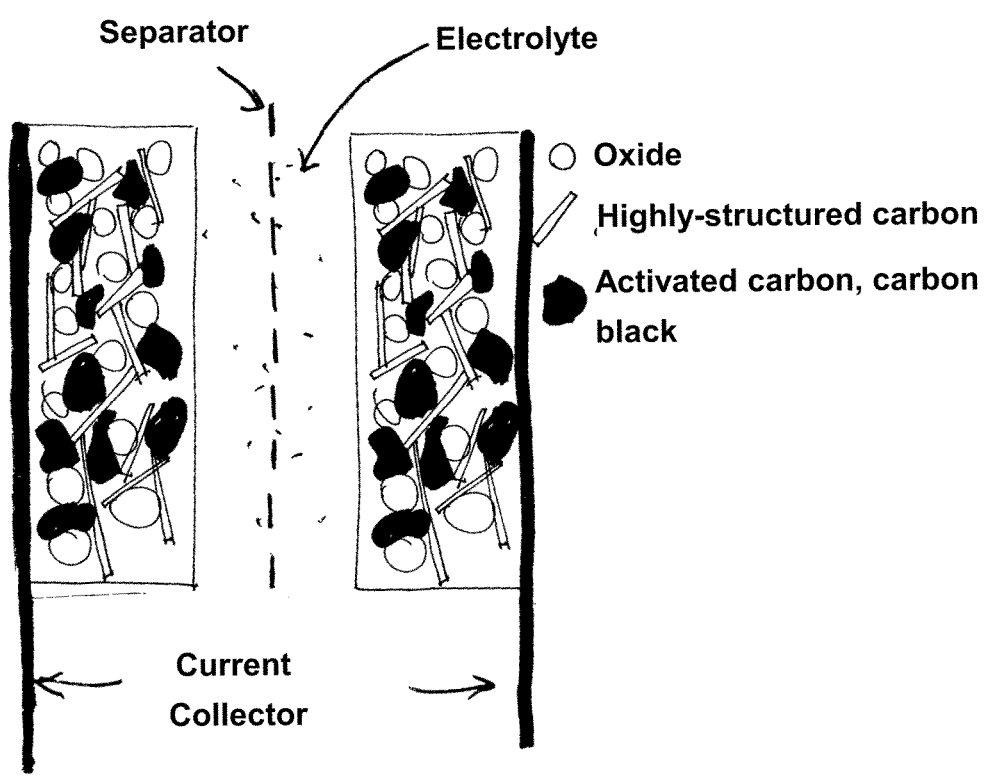
FIG. 12 is a schematic representation of a symmetric supercapacitor with three-component electrodes according to certain embodiments of the present invention.

Referring to FIG. 12, in certain other embodiments of the present invention, three-component electrodes as described above may be incorporated into symmetric supercapacitors, for example, where both the anode and cathode comprise three-component electrodes (the respective components of the anode and cathode may be the same or different).

From the foregoing it can be seen that the present invention can be embodied in various ways, including, but not limited to, the following:

1. An charge storage device comprising: a first electrode; a second electrode; a first current collector in contact with the first electrode; a second current collector in contact with the second electrode; and an electrolyte interposed between the first electrode and the second electrode, wherein the first electrode comprises at least two of a first DLS material, a first ECS material and a first battery material.

2. The charge storage device of embodiment 1, wherein a first portion of the first electrode consists of the first DLS material, and wherein the first portion of the first electrode is in contact with both the first current collector and the electrolyte.

3. The charge storage device of embodiment 2, wherein a second portion of the first electrode consists of the first ECS material, and wherein the second portion of the first electrode is in contact with both the first current collector and the electrolyte.

4. The charge storage device of embodiment 3, wherein the second electrode comprises at least two of a second DLS material, a second ECS material and a second battery material.

5. The charge storage device of embodiment 4, wherein a first portion of the second electrode comprises the second DLS material, wherein the first portion of the second electrode is in contact with both the second current collector and the electrolyte, wherein a second portion of the second electrode comprises the second ECS material, and wherein the second portion of the second electrode is in contact with both the second current collector and the electrolyte.

6. The charge storage device electrode of embodiment 5, wherein the first ECS material has a different chemical composition than the second ECS material.

7. The charge storage device of embodiment 6, wherein at least one of the first DLS material and the second DLS material is carbon nanotubes.

8. The charge storage device of embodiment 1, wherein a first portion of the first electrode comprises the first DLS material, wherein the first portion of the first electrode is in contact with the first current collector, and wherein a second portion of the first electrode comprises the first ECS material, and wherein the second portion of the first electrode is in contact with both the first portion of the first electrode and the electrolyte.

9. The charge storage device of embodiment 8, wherein a third portion of the first electrode comprises the first DLS material, wherein the third portion of the first electrode is in contact with both the first current collector and the electrolyte, and wherein the third portion of the first electrode is thicker than the first portion of the first electrode.

10. The charge storage device of embodiment 9, wherein the first DLS material comprises carbon nanotubes.

11. A supercapacitor comprising: a first electrode; a second electrode; a first current collector in contact with the first electrode; a second current collector in contact with the second electrode; and an electrolyte interposed between the first electrode and the second electrode, wherein a first portion of the first electrode comprises a first DLS material, wherein a second portion of the first electrode comprises a first ECS material, and wherein the second portion of the first electrode is in contact with both the first current collector and the electrolyte.

12. The supercapacitor of embodiment 11, wherein the first portion of the first electrode is in contact with both the first current collector and the electrolyte.

13. The supercapacitor of embodiment 12, wherein the second electrode comprises a second DLS material.

14. The supercapacitor of embodiment 13, wherein the second electrode further comprises a second ECS material.

15. The supercapacitor of embodiment 14, wherein at least one of the first DLS material and the second DLS material comprises carbon nanotubes.

16. An charge storage device comprising: a first electrode; a second electrode; a first current collector in contact with the first electrode; a second current collector in contact with the second electrode; and an electrolyte interposed between the first electrode and the second electrode, wherein the first electrode comprises at least two of a first DLS material, a first ECS material and a first battery material, wherein a first portion of the first electrode comprises the first DLS material, wherein the first portion of the first electrode is in contact with both the first current collector and the electrolyte, and wherein a second portion of the first electrode comprises the first battery material.

17. The charge storage device of embodiment 16, wherein the second portion of the first electrode is in contact with both the first current collector and the electrolyte.

18. The charge storage device of embodiment 17, wherein a third portion of the first electrode comprises the first ECS material.

19. The charge storage device of embodiment 18, wherein a first portion of the second electrode comprises a second DLS material, wherein the first portion of the second electrode is in contact with both the first current collector and the electrolyte, wherein a second portion of the second electrode comprises a second battery material, and wherein the second portion of the first electrode is in contact with both the first current collector and the electrolyte.

20. The charge storage device of embodiment 19, wherein at least one of the first DLS material and the second DLS material comprises carbon nanotubes.

The present invention has been described above with reference to preferred features and embodiments. Those skilled in the art will recognize, however, that changes and modifications may be made in these preferred embodiments without departing from the scope of the present invention. For example, composite electrodes according to certain embodiments of the present invention may comprise interpenetrating networks of CNTs and other nanowires (e.g., those formed from metal oxides such as $MnO_2$, $Co_3O_4$ and/or $NiO$). All references cited anywhere in this specification are hereby incorporated herein by reference.

It will be appreciated from the foregoing that the present invention may be employed in not only supercapacitor applications, but in other applications as well (e.g., batteries, battery-type supercapacitors, etc.). Furthermore, although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A supercapacitor electrode, comprising:
   an ECS material,
   a highly-structured DLS material; and
   a less-structured DLS material, wherein the less-structured DLS material forms an electrically conductive pathway between the ECS material and the highly-structured DLS material.

2. The supercapacitor electrode of claim 1, wherein the ECS material is selected from a group comprising a polymer, oxide, metal oxide nanoparticle and metal oxide nanowire.

3. The supercapacitor electrode of claim 1, wherein the highly-structured DLS material is selected from a group comprising nanowires, nanostructured carbon, graphene and carbon nanotubes.

4. The supercapacitor electrode of claim 1, wherein the less-structured DLS material is selected from a group comprising activated carbon and carbon black.

5. A supercapacitor comprising the electrode claim 1, wherein the supercapacitor is asymmetric or symmetric.

6. The supercapacitor of claim 5, wherein the electrode and an operating voltage are engineered such that charge storage is achieved through a double layer at the electrode surface rather than ion insertion.

7. A supercapacitor electrode, comprising:
   an ECS material,
   a highly-structured DLS material; and
   a less-structured DLS material, wherein the less-structured DLS material forms an electrically conductive pathway between the ECS material and the highly-structured DLS material, and
   wherein the electrode and an operating voltage are engineered such that charge storage is achieved through a double layer at the electrode surface rather than ion insertion.

8. The supercapacitor electrode of claim 7, wherein the ECS material comprises metal oxide nanoparticles.

9. The supercapacitor electrode of claim 8, wherein the highly-structured DLS material is selected from a group comprising graphene and carbon nanotubes.

10. The supercapacitor electrode of claim 9, wherein the less-structured DLS material is selected from a group comprising activated carbon and carbon black.

11. The supercapacitor electrode of claim 10, wherein the supercapacitor is asymmetric.

12. The supercapacitor electrode of claim 10, wherein the supercapacitor is symmetric.

13. The supercapacitor electrode of claim 7, wherein the ECS material comprises a conducting polymer.

14. The supercapacitor electrode of claim 13, wherein the highly-structured DLS material is selected from a group comprising graphene and carbon nanotubes.

15. The supercapacitor electrode of claim 14, wherein the less-structured DLS material is selected from a group comprising activated carbon and carbon black.

16. The supercapacitor electrode of claim 15, wherein the supercapacitor is asymmetric.

17. The supercapacitor electrode of claim 15, wherein the supercapacitor is symmetric.

* * * * *